United States Patent Office 2,856,418
Patented Oct. 14, 1958

2,856,418

SEPARATION PROCESS FOR TRANSURANIC ELEMENT AND COMPOUNDS THEREOF

Melvin Calvin, Berkeley, Calif., assignor to the United States of America as represented by the United States Atomic Energy Commission No Drawing. Application November 13, 1947
Serial No. 785,806

39 Claims. (Cl. 260—429.1)

This invention relates to compounds of plutonium and to a process for the separation of plutonium from aqueous solutions and more especially relates to separation of plutonium from zirconium, neptunium, uranium and fission products.

The present invention also relates to the extraction of plutonium from an organic solvent solution.

It has recently become known that various isotopes of plutonium, the transuranic chemical element having an atomic number of 94, can be prepared by a number of different nuclear processes. For example, it is known that plutonium can be produced in small quantities using a cyclotron for the bombardment of natural uranium with neutrons as follows:

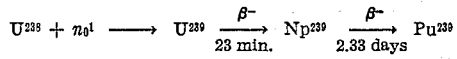

where Np is the chemical symbol for the element neptunium having an atomic number of 93. Other isotopes of plutonium are obtained by neutron bombardment of $Pu^{239}$ as follows:

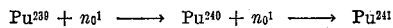

Furthermore, the plutonium isotope of mass 238, referred to as $Pu^{238}$, can be prepared by deuteron bombardment of the uranium isotope of $U^{238}$ to produce $Np^{238}$ followed by beta decay of $Np^{238}$ to $Pu^{238}$.

In addition to the production of plutonium by neutron bombardment of uranium using a cyclotron, neutronic reactors have been developed for the production of plutonium and desirable fission products from natural uranium by a self-sustaining chain reaction. One of the isotopes of uranium occurring in natural uranium is $U^{235}$ and it is present in the amount of 0.71% by weight. When this isotope is bombarded by slow neutrons, preferably of thermal energies, it undergoes fission and releases on an average about two neutrons per fission, in addition to the production of fission fragments of relatively low atomic weights. The main constituent of natural uranium, namely, $U^{238}$, absorbs thermal neutrons to produce $Pu^{239}$ and $Pu^{240}$ by means of the reactions shown above. Both of these isotopes of plutonium can undergo fission by bombardment with slow neutrons as does $U^{235}$ and likewise they produce on an average two neutrons per neutron absorbed when fission occurs. Thus, in a natural uranium neutronic reactor the excess neutrons that are released by fission are sufficient to maintain a production of plutonium through neutron absorption by the predominant uranium isotope $U^{238}$. However, the concentration of plutonium, thus produced, is generally small, rarely being above 1% by weight of the uranium and usually being substantially below this concentration. Thus, it is necessary to recover plutonium and fission products from uranium masses from neutronic reactors having plutonium and fission product concentrations below one part per thousand parts and even one part per million parts of uranium.

As mentioned above, during neutron irradiation of uranium there is produced in addition to the transuranic elements, Np and Pu, other elements of lower atomic weight, known as fission fragments. These radioactive fission fragments are composed of two distinct groups of elements, namely, a light element group and a heavy element group. The light element group contains elements having atomic numbers between about 35 and 46 and the heavier element group is composed of atomic numbers between about 51 and 60. The elements of both of these groups as originally produced, being considerably overmassed and undercharged, are highly unstable. By means of beta radiation they quickly transform themselves into isotopes of other elements having longer half-lives. The fission fragments and the resulting decay products are collectively known as fission products.

The various radioactive fission products have half-lives that range from a fraction of a second to thousands of years. Those having very short half-lives may be substantially eliminated by aging the neutron-irradiated material for a reasonable period of time before further processing. Those radioactive fission products having very long half-lives do not have a sufficiently intense radiation to endanger personnel protected by moderate shielding. On the other hand, the radioactive fission products that have half-lives ranging from a few days to a few years have dangerously intense radiations which cannot be eliminated by aging for practical storage periods. The fission products are chiefly the radioactive isotopes of Sr, Y, Zr, Cb, and Ru of the light group and Te, I, Cs, Ba, La, Ce, and Pr of the heavy group.

The material from the neutronic reactor contains an amount of fission products that is of about the same order of magnitude as the amount of plutonium present. In order to recover the plutonium, it is necessary to separate it from large masses of uranium and from a large number of elements having lower molecular weights.

When uranium is in a neutronic reactor for a long time, there are produced, along with plutonium isotopes and fission products, isotopes of neptunium, $Np^{237}$ and $Np^{239}$. $Np^{237}$ is an alpha-emitter with a half-life of ca. $2.2 \times 10^6$ years. $Np^{239}$, as mentioned above, has a half-life of 2.33 days and by beta-decay produces $Pu^{239}$. By aging, the concentration of $Np^{239}$ becomes very small. By means of some of the processes that have been developed, neptunium and plutonium are separated from uranium and fission products, resulting in an aqueous solution containing plutonium and neptunium. For some purposes it is desirable to separate the plutonium and neptunium.

One of the various processes that have been developed for the separation of plutonium from uranium and fission products consists of a carrier precipitation process in which zirconium phosphate is used as the carrier precipitate for plutonium. When this precipitate is dissolved in a strong inorganic acid, there is produced an aqueous solution containing zirconium ions and plutonium ions and there is a problem of separating plutonium from zirconium.

It is an object of the present invention to provide new compounds of plutonium.

A second object of this invention is to separate plutonium from its aqueous solution.

A third object of the present invention is to separate plutonium from aqueous solutions containing plutonium, uranium, and fission products.

Another object of this invention is to separate plutonium from an aqueous solution containing plutonium and neptunium.

A further object of the present invention is to separate zirconium from an aqueous solution containing plutonium and zirconium.

Still a further object of this invention is to separate plutonium from an organic solvent solution containing plutonium and zirconium.

It is also an object of this invention to provide a means for separating plutonium from its solution in the organic solvent used to extract plutonium from aqueous solutions.

Other objects of this invention will be apparent from the description which follows:

I have found that a suitable separation of plutonium from an acidic aqueous solution of a plutonium salt can be made by contacting the aqueous solution with a certain type of chelating agent, alone or as an organic solvent solution, to form a plutonium chelate compound. When the organic solvent is present the plutonium chelate compound is extracted; otherwise, it is separated by filtration or other suitable means.

The chelating agent of the present invention is a fluorinated β-diketone having the general formula:

wherein R is a member of the group consisting of alkyl, aryl, aralkyl, alkaryl and heterocyclic radicals and $R^1$ and $R^2$ are members of the group consisting of hydrogen and fluorine. Of course, the R group may contain various substituents such as halogen groups and nitro groups. It is preferred that $R^1$ and $R^2$ are both fluorine atoms and examples of such a class of compounds are:

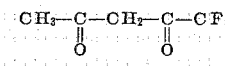

Trifluoroacetylacetone

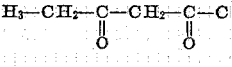

Propionyltrifluoroacetone

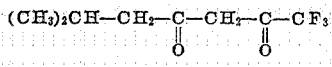

Isovaleryltrifluoroacetone

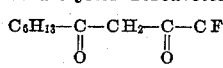

Heptanoyltrifluoroacetone

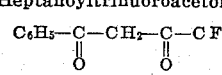

Benzoyltrifluoroacetone

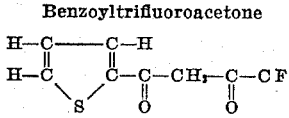

2-thenoyltrifluoroacetone

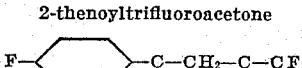

p-Fluorobenzoyltrifluoroacetone

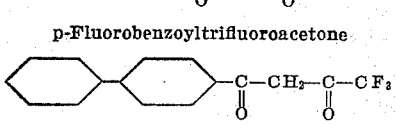

p-Phenylbenzoyltrifluoroacetone

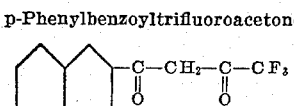

β-Naphthoyltrifluoroacetone

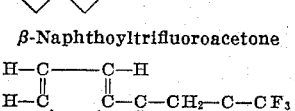

2-furoyltrifluoroacetone

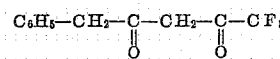

Phenylacetyltrifluoroacetone

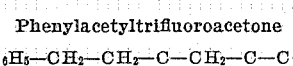

3-phenylpropionyltrifluoroacetone

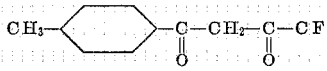

p-Methylbenzoyltrifluoroacetone

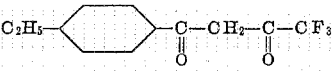

p-Ethylbenzoyltrifluoroacetone

Examples of suitable fluorinated β-diketones containing less than three fluorine atoms are:

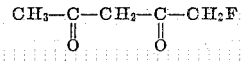

Fluoroacetylacetone

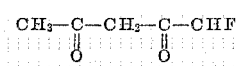

Difluoroacetylacetone

The efficiency of chelation-extraction is not the same for all; e. g., using trifluoroacetylacetone as unity the following relative concentrations of some of the other β-diketones are necessary for equivalent tetravalent plutonium extraction: one for 2-furoyltrifluoroacetone; one-third for propionyltrifluoroacetone; one-fifth for isovaleryl-trifluoroacetone; one-seventh for benzoyltrifluoroacetone; and one-fifteenth for 2-thenoyltrifluoroacetone.

The organic solvent for the present invention is a non-polar substantially water-immiscible organic compound, which is liquid at the temperature of carrying out the process. Examples of suitable types of organic solvents are aromatic hydrocarbons, chlorinated aromatic hydrocarbons and chlorinated paraffinic hydrocarbons. Specific examples are benzene, toluene, chlorobenzene, hexafluoroxylene, chloroform, carbon tetrachloride, and trichloroethylene. Benzene, toluene, and hexafluoroxylene are the preferred solvents.

The acid present in the aqueous solution is a strong inorganic acid and its concentration will be between about 0.05 and 1 N. Nitric acid and hydrochloric acid are the preferred acids and their preferred concentrations when no uranium salt is present are between about 0.1 and 0.7 N. When a uranyl salt is present their preferred concentrations are also between about 0.1 and 0.7 N. The temperature at which the process is carried out may be varied considerably and the preferred temperature is room temperature. The time of contact between the aqueous solution and chelating agent is preferably greater than fifteen minutes.

The concentration of the chelating agent in the organic solvent may be varied widely, since successful chelation-extraction of plutonium occurred with a chelating agent concentration of 0.01 M and with pure chelating agent. For any particular operation the preferred concentration and the total amount will vary with the nitric acid content and tetravalent plutonium content of the aqueous solution. The efficiency of extraction is approximately directly proportional to the third power of chelating agent concentration and inversely proportional to the third power of the hydrogen ion concentration.

The ratio of organic solvent solution to aqueous solution may be varied widely, but the preferred range is between 5 to 1 and 1 to 5.

The new compounds of plutonium of this invention are chelate compounds of tetravalent plutonium and the fluorinated β-diketones and are represented by the general formulas:

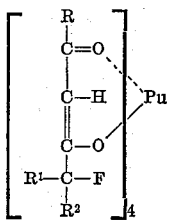

and

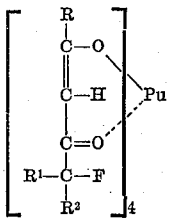

wherein R, R¹, and R² represent the same groups as indicated above for the general formula of the chelating agent. It is seen that there are two possible formulas for the plutonium chelate compounds, since the β-diketone may enolize in either of two ways. In either case, plutonium is bonded to the oxygen atoms by a covalent bond and a coordinate bond and due to resonance the two compounds would be identical. These compounds are water-insoluble solids, slightly soluble in 0.05–1 N acid, soluble in benzene, toluene and other organic solvents. The solubility of the plutonium chelate compound of thenoyltrifluoroacetone in benzene is 0.012 M. The chelates are destroyed by strong acids and acidic aqueous solutions containing agents that form water-soluble complexes such as the fluosilicate ion. These compounds may be used to form decorative coatings or to coat foil which can be used in a neutron-detecting ion chamber, where plutonium will fission by neutron bombardment producing β- and γ-radiation that will be detected in the chamber.

In one embodiment of this invention plutonium is separated from an aqueous solution containing a tetravalent plutonium salt by contacting the aqueous solution with an orginac solvent solution of a fluorinated β-diketone of the type described above. The aqueous solution contains a strong inorganic acid, and its concentration is mentioned above along with the ratio of aqueous solution to organic solvent solution and other conditions. The resultant aqueous phase and organic solvent extract phase are separated by settling or centrifugation; the extract phase contains a plutonium chelate compound of the fluorinated β-diketone.

The plutonium may be separated from the organic solvent solution of plutonium chelate compound by contacting the organic solvent solution with an aqueous solution containing a material which converts plutonium of the chelate compound to a water-soluble, organic-solvent-insoluble compound, and separating the resultant organic solvent phase and aqueous extract phase containing a plutonium compound. The volume ratios of organic solvent solution and aqueous solution may be varied as in the case of the first extraction. There are three types of materials capable of converting plutonium into a water-soluble compound and these are: strong inorganic acids, present in aqueous solution at a concentration of at least 0.1 N and having a substantially greater acidity, e. g., at least 0.2 N more acid, than the aqueous extracted solution, and preferably at least 1 N total acid concentration; complexing agents, such as fluosilicate ion; and reducing agents, such as hydroxylamine hydrochloride, ferrous chloride, and stannous chloride in nitric acid. These particular reducing agents will reduce tetravalent plutonium present in benzene as a chelate compound, and trivalent plutonium will be extracted by the aqueous phase without destruction of the β-diketone. The strong inorganic acids, such as hydrochloric, nitric, and sulfuric acids, are believed to extract by forming complexes with tetravalent plutonium and, therefore, their action would be similar to the complexing agents, such as fluosilicate ion. When the material is a reducing agent, plutonium is reduced to the trivalent state, and, as will be illustrated below, trivalent plutonium is not extracted from a weakly acidic solution by a chelating agent of this invention. The concentration of complexing agent, such as fluosilicate ion, in the aqueous solution will depend upon the volume ratio of aqueous and organic solutions and upon the amount of plutonium chelate compound in the organic solvent solution; may be suitably between 0.001 and 1 N. When a reducing agent is used a similar concentration in the aqueous solution may be employed.

The following examples are illustrative of this embodiment of the invention.

EXAMPLE I

An aqueous solution containing about 0.2 mg. of tetravalent plutonium nitrate per liter and 0.5 N nitric acid was used in each experiment and 10 ml. of the aqueous solution was contacted with 5 ml. of benzene containing fluorinated β-diketone. In Table I the results are presented showing the favorable extraction coefficients for fluorinated β-diketones of the type covered by this invention.

Table I.—*Extraction coefficients of tetravalent plutonium using various fluorinated β-diketones*

| Ketone | Initial ketone molarity in benzene | Time of shaking, min. | Extraction coefficient [1] |
|---|---|---|---|
| Trifluoroacetylacetone | { 0.25 | 30 | 3 |
|  | 0.41 | 30 | 11.5 |
| Methyltrifluoroacetylacetone | 0.2 | 30 | 0 |
| Propionyltrifluoroacetone | { 0.218 | 30 | 52 |
|  | 0.145 | 60 | 8.9 |
| Methylpropionyl-trifluoroacetone | 0.269 | 30 | 0 |
| Benzoyltrifluoroacetone | { 0.33 | 30 | ca. 400 |
|  | 0.08 | 60 | 25 |
| Isovaleryltrifluoroacetone | 0.115 | 150 | 37 |

[1] Extraction coefficient is the ratio of plutonium concentrations in benzene and in aqueous solution.

The data show that two fluorinated β-diketones not covered by the general formula for the chelating agent of this invention have extraction coefficients of 0. These latter compounds are methyltrifluoroacetylacetone and methylpropionyltrifluoroacetone which do not contain a $CH_2$ group but contain a $CHCH_3$ group between the two carbonyl groups.

EXAMPLE II

Two milliliters of 0.5 N nitric acid containing about 0.2 mg. of tetravalent plutonium nitrate per liter was contacted with 1 ml. of benzene containing 0.03 ml. of trifluoroacetylacetone, i. e., 0.25 M. Contacting consisted of thirty minutes of shaking. The extraction coefficient between benzene and aqueous solution was 3.

EXAMPLE III

An aqueous solution containing 0.5 M uranyl nitrate, 0.5 M nitric acid and about 0.2 mg. per liter of tetravalent plutonium nitrate was extracted with a benzene solution of 0.3 M trifluoroacetylacetone, and the resultant benzene solution was contacted with 2 N nitric acid in a volume ratio of aqueous solution to benzene of 2. More than 99% of the plutonium was extracted by the nitric acid solution. When another portion of the benzene solution of plutonium chelate compound was contacted with 1 N nitric acid in the same volume ratio, 86% plutonium was extracted by the nitric acid solution. These data show that tetravalent plutonium was satisfactorily re-extracted by an inorganic acid solution of 1 N and greater concentration. In other experiments, where the concentration of nitric acid was as low as 0.5 N, more than 90% of the plutonium was extracted by the nitric acid solution where the initial concentration of trifluoroacetylacetone in benzene for the first extraction was considerably less than 0.3 M, for example, 0.116 and 0.058 M. These data indicate that, if the concentration of chelating agent is quite low, it is not necessary, but preferable, to have an acid concentration of 1 N or greater to satisfactorily re-extract. The reason for this, it was found, is that the distribution coefficient between the organic solvent solution of the chelating agent and the acidic aqueous solution varies directly with the third power of the concentration of chelating agent and inversely with the third power of the hydrogen ion concentration due to the acid.

EXAMPLE IV

When aqueous solutions containing 0.5 N $HNO_3$, 0.1 M hydroxylamine hydrochloride, and a mixture of trivalent and tretravalent plutonium nitrates were contacted with 0.8 M trifluoroacetylacetone in benzene, the extraction coefficients between benzene and aqueous solution of trivalent and tetravalent plutonium were about 0.001 and 45, respectively. These data show that plutonium should be in the tetravalent and not the trivalent state to separate plutonium from an aqueous solution by the process of this invention.

EXAMPLE V

A benzene solution of the plutonium chelate compound with trifluoroacetylacetone was contacted with a weakly acidic solution containing 0.01 M sodium fluosilicate, and the extraction by the aqueous solution was nearly quantitative. The same aqueous solution without sodium fluosilicate had an extraction coefficient between benzene and the aqueous solution of 15. This illustrates the superiority of the process where a complexing agent is used to re-extract plutonium from an organic solvent solution into an aqueous solution.

EXAMPLE VI

In several experiments portions of a tetravalent plutonium chelate compound of trifluoroacetylacetone were contacted with an equal volume of 0.5 N nitric acid solution of stannous chloride. The data presented below in Table II illustrate the effectiveness of stannous chloride for reducing plutonium to the water-soluble trivalent state.

*Table II.—Reduction and re-extraction of tetravalent plutonium by nitric acid solution of stannous chloride*

| Time of shaking, min. | Concn. of stannous chloride, M | Percent Pu extracted by aq. soln. |
|---|---|---|
| 10 | 0.05 | 40 |
| 10 | 0.05 | 60 |
| 10 | 0.05 | 92 |
| 10 | 0.10 | 75 |
| 10 | 0.10 | 82 |
| 10 | 0.10 | 97 |
| 20 | 0.10 | 97 |
| 20 | 0.10 | 98 |
| 20 | 0.10 | 100 |

In the second embodiment of the present invention, plutonium is separated from its mixture with uranium and fission products by dissolving the mixture as salts in an aqueous solution, converting all of the plutonium to the tetravalent state, contacting this aqueous solution with an organic solvent solution of a chelating agent of the type described above. The concentration of acid in the aqueous solution, volume ratio of organic solvent to aqueous solution, and other conditions are those referred to above.

The following examples illustrate this embodiment of the invention.

EXAMPLE VII

Uranium obtained from a neutronic reactor and containing plutonium and fission products was dissolved in concentrated nitric acid and the resultant aqueous solution was diluted to form a solution that was 0.5 M in uranyl nitrate and 0.44 N in nitric acid. Hydroxylamine hydrochloride was added to provide 0.1 M initial concentration and to reduce all of the tetravalent and hexavalent plutonium in the aqueous solution to trivalent plutonium. The plutonium concentration was about 0.1 mg. per liter. This aqueous solution was washed four times with an equal volume of 0.4 M trifluoroacetylacetone in benzene. The washing in each case consisted of a 2-minute shaking. The four benzene washes were discarded. Potassium nitrite was added to the aqueous solution to provide a concentration of 0.25 M in excess of that required to destroy the hydroxylamine hydrochloride. The potassium nitrite oxidized trivalent plutonium to tetravalent plutonium. The resultant aqueous solution was shaken for thirty minutes with one-half its volume of 1.07 M trifluoroacetylacetone in benzene. A second extraction was made using the same concentration of the β-diketone in benzene. The aqueous phase was then discarded and the benzene extracts were combined. The benzene solution was washed four times with double its volume of 0.05 N nitric acid with a 2-minute shaking in each case and the acid washes were discarded. The benzene solution was contacted with an equal volume of 0.5 N nitric acid and the benzene phase was discarded. This completed one cycle of extraction and re-extraction. Further plutonium purification was carried out as follows: The aqueous solution was made 0.1 M in hydroxylamine hydrochloride to reduce plutonium to the trivalent state. This solution was washed three times with equal volumes of 0.825 M trifluoroacetylacetone in benzene and the benzene washes were discarded. Potassium nitrite was added to the aqueous solution to provide 0.25 M potassium nitrite in excess of that required to destroy hydroxylamine hydrochloride, thereby oxidizing plutonium to the tetravalent state. This solution was extracted once with one-half its volume of 0.825 M trifluoroacetylacetone in benzene.

The final benzene solution and two of the intermediate solutions were analyzed for plutonium and for β- and γ-radiation. The data are presented below in Table III. The decontamination factor is the ratio of radiation of the initial material to the radiation of the purified material.

*Table III.—Plutonium chelation-extraction by trifluoroacetylacetone in benzene and decontamination factors*

| Step | Percent Over-all Pu recovery | Over-all decontamination factors | |
|---|---|---|---|
| | | β | γ |
| Extraction by benzene solution and after 0.05-N-$HNO_3$ washes | 93 | 750 | 110 |
| Re-extraction by 0.5 N $HNO_3$ | 88.7 | 2,220 | 360 |
| Re-extraction by 0.825 M trifluoroacetylacetone solution | 82 | $3.8 \times 10^5$ | $3.7 \times 10^4$ |

Example VII illustrated the extraction-decontamination process using trifluoroacetylacetone for the first step consisting of washes of benzene containing trifluoroacetylacetone when plutonium is in the trivalent state. The following example illustrates the extraction-decontamination process using trifluoroacetylacetone for the extraction of tetravalent plutonium as the first step.

EXAMPLE XII

Thirty milliliters of an aqueous solution containing 0.55 M uranyl nitrate, 0.35 N nitric acid, 0.15 M sodium sulfate and tetravalent plutonium as the nitrate was shaken with 10.7 ml. of 0.35 M trifluoroacetylacetone in benzene. The benzene solution was washed twice with 20-ml. portions of 0.02 N nitric acid and then was contacted with 5 ml. of 2 N nitric acid. Another extraction was made with 5 ml. of 2 N nitric acid. Analyses of the soluitons showed plutonium had an extraction coefficient between benzene and the original aqueous solution of 68 and $\gamma$-radiation had a distribution coefficient of 1.33. The distribution coefficient between benzene and 2 N nitric acid solution for plutonium was 0.047 and for $\gamma$-radiation was 4.57. These data show both a satisfactory extraction for plutonium by the benzene solution of trifluoroacetylacetone and re-extraction with 2 N nitric acid. The data also show that the $\gamma$-radiation, which is favorably extracted by the benzene solution of trifluoroacetylacetone, is primarily left in the benzene solution when 2 N nitric acid is used to re-extract plutonium. The plutonium content of the final aqueous solution was 96% and the $\gamma$-radiation was 15% of the amounts present in the initial aqueous solution. As will be seen below, the $\gamma$-radiation was primarily due to radioactive zirconium which formed a chelate compound with trifluoroacetylacetone.

EXAMPLE XIII

This example illustrates both the chelation-extraction with thenoyltrifluoroacetone and the reduction of tetravalent plutonium present in a benzene solution as the chelate compound by the use of an acidic solution of hydroxylamine hydrochloride. An aqueous solution containing 2 M uranyl nitrate, 0.21 N nitric acid, plutonium nitrate, and radioactive fission products as nitrates was extracted twice with one-fourth of its volume of 0.06 M thenoyltrifluoroacetone in benzene with a 30-minute stirring in each case. The combined benzene extract was diluted with an equal volume of benzene and was washed twice with one-fourth of its volume of 0.05 N nitric acid using a 15-minute stirring. The washed benzene solution was stirred for eighty minutes with a one-fourth volume of 0.8 N nitric acid containing 0.2 M hydroxylamine hydrochloride to reduce plutonium to the trivalent state and to extract it. The final aqueous solution and an intermediate solution were analyzed and the data are presented below in Table VII.

*Table VII.—Plutonium chelation-extraction by thenoyltrifluoroacetone in benzene and reduction—re-extraction*

| Step | Percent Over-all Pu recovery | Over-all decontamination factors | |
|---|---|---|---|
| | | $\beta$ | $\gamma$ |
| Extraction by benzene solution | [1] 90 | 15.5 | 3.6 |
| Final aqueous solution | 88.4 | 870 | 151 |

[1] The 10% loss was due to the fact that plutonium in the original solution was only 90% in the tetravalent state.

EXAMPLE XIV

In each of the following experiments 10 ml. of 0.5 N hydrochloric acid containing tetravalent plutonium in a tracer amount was equilibrated with one-half its volume of 0.02 M thenoyltrifluoroacetone in benzene. Ferrous chloride in the amounts indictaed in Table VIII below was then added and the distribution of plutonium between the two phases was measured as a function of time.

*Table VIII.—Effect of ferrous chloride concentration on reduction of tetravalent plutonium thenoyltrifluoroacetone chelate*

| Time, min. | Percent Pu reduction using ferrous chloride, concn., M | | | | |
|---|---|---|---|---|---|
| | 0.001 | .0049 | .005 | 0.010 | 0.050 |
| 2 | [1] 20.2 | 16.7 | [1] 21.0 | 14.5 | 16.9 |
| 5 | 31.6 | [2] 37.4 | [2] 36.5 | [2] 36.2 | 31.6 |
| 10 | 59.9 | 60.2 | 60.1 | 66.3 | 66.0 |
| 20 | 80.9 | 87.4 | 88.1 | 92.8 | 87.8 |
| 30 | 96.2 | 97.4 | 96.8 | 99.1 | 97.8 |
| 45 | 99.1 | 99.9 | | | |
| 60 | 99.7 | | | | |

[1] Measured at 2.5 minutes instead of 2 minutes.
[2] Measured at 5.3 minutes instead of 5 minutes.

EXAMPLE XV

This example illustrates the chelation-extraction process on a semi-works basis and illustrates the use of ferrous chloride as the reducing agent in the re-extraction step. Neutron-irradiated uranium was dissolved in concentrated nitric acid to produce upon dilution 1.6 l. of a solution containing 2 M uranyl nitrate, 0.2 N nitric acid and plutonium present in several oxidation states with a total plutonium concentration of about 5 mg. per liter. This solution was made 0.005 M in urea and allowed to stand for fifteen minutes to destroy oxides of nitrogen. Then the solution was made 0.002 M in ferrous chloride and allowed to stand twenty minutes to reduce all plutonium to the trivalent state. The solution was made 0.02 M in sodium nitrite and oxygen was bubbled through for several minutes. Sodium nitrite oxidized plutonium to the tetravalent state and the oxygen destroyed nitric oxide, NO, thereby obtaining the maximum ratio of tetravalent to trivalent plutonium in their equilibrium in the acid solution. This aqueous solution was extracted twice with one-eighth of its volume of 0.13 M thenoyltrifluoroacetone in benzene using a 20-minute stirring in each case. The combined benzene extract was diluted to 0.73 volume unit with benzene in order to lower the extraction coefficient of trivalent plutonium so that only 0.1% loss will result in the next step. The dilution was also made to increase the rate of reduction. The diluted benzene extract phase was stirred for two hours with an aqueous solution containing 0.5 N nitric acid, 0.01 M hydroxylamine hydrochloride and 0.003 M ferrous chloride. The hydroxylamine hydrochloride was used to stabilize the ferrous ion which was the reducing agent. The aqueous phase from this step contained 99.64% of the initial plutonium. After two more cycles the over-all plutonium recovery was 99.08%. In another run using three and one-half cycles the over-all plutonium recovery was 98.91% and the over-all $\beta$ and $\gamma$ decontamination factors were about $4 \times 10^7$ and $1 \times 10^6$, respectively. Comparable recoveries and decontaminations were attained using toluene instead of benzene.

EXAMPLE XVI

An aqueous solution containing 20% uranyl nitrate hexahydrate, 0.1 N nitric acid and 25 mg. of tetravalent plutonium per liter was prepared. Spectrophotometric analysis indicated neither trivalent nor hexavalent plutonium was present. Portions of this solution were contacted by a 2-minute shaking with different solutions of trifluoroacetylacetone and the volume ratio in each case was 1. The results are reported below in Table IX.

EXAMPLE VIII

An aqueous solution containing 0.5 M uranyl nitrate, 0.44 N nitric acid, tetravalent plutonium and fission products as nitrates was contacted with two one-half volumes of 1.07 M trifluoroacetylacetone in benzene. The resultant benzene extract phases containing tetravalent plutonium were combined with the combined benzene solution was washed five times with one-half its volume of 0.05 N nitric acid. In each case the washing consisted of a 15-minute shaking. Tetravalent plutonium was re-extracted from the benzene phase by contacting with an equal volume of 0.5 N nitric acid, an equal volume of 0.6 N nitric acid, and one-half volume of 0.6 N nitric acid. In each case the contacting consisted of a 30-minute shaking. The acid extract phases were combined, made 0.1 M in hydroxylamine hydrochloride, and heated fifteen minutes at 75° C. to reduce plutonium to the trivalent state. The resultant solution was washed three times with equal volumes of 0.825 M trifluoroacetylacetone in benzene with a 15-minute shaking in each case. The aqueous solution was made 0.6 M in sodium nitrite and heated fifteen minutes at 75° C. to oxidize plutonium to the tetravalent state and to destroy hydroxylamine and trifluoroacetylacetone in the aqueous solution. The resultant tetravalent plutonium solution was extracted three times each with one-half its volume of 0.825 M trifluoroacetylacetone in benzene. The benzene extracts were combined and subjected to two washes each with one-half volume of 0.05 M nitric acid and a 30-minute shaking in each case, thus completing one and one-half cycles of the extraction-decontamination process. The final solution and some of the intermediate solutions were analyzed for plutonium and for $\beta$- and $\gamma$-radiation. Data are presented in Table IV.

Table IV.—*Plutonium chelation-extraction by trifluoroacetylacetone in benzene and decontamination factors*

| Step | Percent Over-all Pu recovery | Over-all decontamination factors | |
|---|---|---|---|
| | | $\beta$ | $\gamma$ |
| Extraction by benzene solution and after 0.05-N-HNO₃ washes | 99.5 | 8.6 | 2.9 |
| Nitric acid re-extraction phase | 99.2 | 14.4 | 5.0 |
| Acid phase after reduction of Pu and benzene solution washes | 95.7 | 670 | 465 |
| Extraction by benzene solution | 90.3 | 5.2×10³ | 1.3×10⁴ |

EXAMPLE IX

This example illustrates both that plutonium can be separated from an aqueous solution containing uranyl nitrate and that only tetravalent plutonium was substantially extracted, while trivalent and hexavalent plutonium remained unextracted by the process of this invention.

Three aqueous solutions were prepared each containing 20% uranyl nitrate hexahydrate, 0.2 N nitric acid, and 25 mg. of plutonium per liter. In one solution 0.001 M hydrazine was added as hydrazine sulfate to reduce tetravalent plutonium to the trivalent state, and the solution was digested for three hours at 75° C. In the second solution plutonium was present in the tetravalent state, but spectrophotometric analysis showed it contained about 12% hexavalent plutonium. The third solution was prepared from a quantity of the second solution by adding 0.01 N potassium dichromate and digesting for two hours at 75° C. to oxidize plutonium to the hexavalent state. Table V presents the data obtained by shaking these aqueous solutions each with an equal volume of 1 M trifluoroacetylacetone in benzene and analyzing aliquots of extract and raffinate phases for plutonium content.

Table V.—*Extraction of plutonium of various valence states by 1 M trifluoroacetylacetone in benzene*

| Valence state of Pu | Percent Pu extracted by shaking ¹ for— | |
|---|---|---|
| | 5 min. | 15 min. |
| Trivalent | 6.3 | 13.5 |
| Tetravalent | 84 | 89 |
| Hexavalent | 0.6 | 1.5 |

¹ Followed by a 15-minute sampling interval.

The small amount of extraction of plutonium from the trivalent plutonium solution was found to be due primarily to oxidation to the tetravalent state. Since the tetravalent plutonium solution contained about 12% hexavalent pluonium, it is seen that tetravalent plutonium was approximately 100% extracted. This conclusion is based on the fact that the hexavalent plutonium solution showed extraction of 0.6% upon a 5-minute shaking. This extraction was probably due to unoxidized tetravalent plutonium since the dichromate concentration in the aqueous solution was low.

An aqueous solution containing 20% uranyl nitrate hexahydrate, 0.2 N nitric acid and 25 mg. of plutonium per liter was digested with 0.01 M hydrazine sulfate and extracted with 1 M trifluoroacetylacetone in benzene. Only 3.3% plutonium was extracted and it was believed to be tetravalent plutonium.

EXAMPLE X

Aqueous solutions containing 20% uranyl nitrate hexahydrate, 1 N sulfuric acid, 0.1 N nitric acid and 25 mg. of total plutonium per liter were prepared by mixing solutions of trivalent and tetravalent plutonium containing the other ingredients in the concentrations indicated above. These mixtures were contacted for two minutes with an equal volume of 5 M trifluoroacetylacetone in benzene and the percent extracted in each case is presented in Table VI, along with the percent of plutonium that was in the tetravalent state in the initial aqueous solutions.

Table VI.—*Analysis of tri- and tetravalent plutonium mixtures with 5 M trifluoroacetylacetone in benzene*

| Percent Tetravalent Pu in initial aq. soln. | Percent Plutonium extracted |
|---|---|
| 98 | 97 |
| 74.5 | 74.5 |
| 51 | 51.4 |
| 27.5 | 24.3 |
| 4.5 | 4.8 |

EXAMPLE XI

An aqueous solution containing 0.8 M uranyl nitrate, 0.2 N nitric acid, 0.5 M sodium sulfate and 25 mg. of tetravalent plutonium per liter was contacted with a benzene solution of trifluoroacetylacetone and the resultant benzene phase was then washed with successive portions of an aqueous solution. Plutonium was extracted from the washed benzene layer into 2 N nitric acid solution. This cycle was repeated after a ten-fold dilution of the 2 N nitric acid and the resultant decontamination factor of plutonium at the chelation-extraction stage of the second cycle was about 1×10⁴. This experiment showed both a high degree of separation of plutonium from its mixture with fission products and showed the satisfactory re-extraction of plutonium from its benzene solution as a chelate compound by the use of 2 N nitric acid,

*Table IX.—Chelation-extraction of tetravalent plutonium using various solvents*

| Solvent | Trifluoroacetylacetone concn., M | Percent Pu extracted |
|---|---|---|
| Benzene | 5 | 97.8 |
|  | 7.5 | 97.4 |
| Hexafluoroxylene | 5 | 96.1 |
|  | 7.5 | 96.9 |
| Chlorobenzene | 5 | 96.9 |
|  | 7.5 | 97.6 |

EXAMPLE XVII

An aqueous solution containing 20% uranyl nitrate hexahydrate, 0.1 N nitric acid, 1 N sulfuric acid and 25 mg. of plutonium per liter was prepared and a portion of it upon extraction with 5 M trifluoroacetylacetone in benzene indicated 84% of the plutonium was present as tetravalent plutonium. Other portions of this solution were contacted with an equal volume of various concentrations of trifluoroacetylacetone in chloroform consisting of a 10-minute shaking followed by a 15-minute sampling interval and the results are presented in Table X below.

*Table X.—Extraction of plutonium as trifluoroacetylacetone chelate using chloroform*

| Concentration of $\beta$-diketone, M | Percent Tetravalent Pu extracted |
|---|---|
| 2 | 79.4 |
| 4 | 96.2 |
| 6 | 97.5 |
| 8 | 103 |

The value of 103% using 8 M trifluoroacetylacetone indicates some of the hexavalent plutonium was chelated and extracted or was reduced and extracted as the tetravalent plutonium compound.

EXAMPLE XVIII

An aqueous solution containing 1 N sulfuric acid, 0.1 N nitric acid and 25 mg. of plutonium per liter was prepared with reduction of the plutonium to trivalent plutonium by 0.001 M hydrazine. Upon standing, part of the plutonium was oxidized to tetravalent plutonium, since upon shaking for five minutes with an equal volume of a benzene solution containing 5 M trifluoracetylacetone, 7.8% plutonium was extracted. Using other portions of the aqueous solution they were contacted by a 5-minute shaking with equal volumes of trifluoroacetylacetone solutions in other solvents. The data are shown below in Table XI.

*Table XI.—Chelation-extraction of tetravalent plutonium using various solvents*

| Solvent | Concentration of trifluoroacetylacetone, M | Percent Pu extracted |
|---|---|---|
| Chloroform | 6.7 | 6.8 |
| Carbon tetrachloride | 6.7 | 7.5 |
| Trichloroethylene | 6.7 | 7.4 |

The experiments in Examples XVI, XVII, and XVIII demonstrated that quite a few organic solvents are suitable for the process. The values for percent plutonium extracted in Table XI appear low but it must be remembered that these values are for percent plutonium where the initial solution before standing was approximately 100% trivalent plutonium. Since benzene showed 7.8% plutonium extracted, this was indicative of the tetravalent plutonium content; therefore, the other three solvents (Table XI) showed a high percentage of extraction of tetravalent plutonium as a chelate compound.

EXAMPLE XIX

The data in Table XII below illustrate the effect of acid concentration and uranyl nitrate concentration on the plutonium distribution coefficient between benzene and nitric acid.

*Table XII.—Variation of distribution coefficient of tetravalent plutonium*

| Nitric acid concn., N | Uranyl nitrate concn., M | Trifluoroacetylacetone concn. in benzene, M | Distribution coefficient |
|---|---|---|---|
| 0.5 |  | 0.56 | 21 |
| 0.5 |  | 0.30 | 5.6 |
| 0.5 |  | 0.24 | 2.9 |
| 0.25 |  | 0.24 | 22 |
| 1.0 |  | 0.24 | 0.15 |
| 0.5 | 0.8 | 0.24 | 0.46 |
| 0.5 | 0.5 | 0.24 | 0.84 |
| 0.5 | 0.1 | 0.24 | 2.2 |

Of course, with higher concentrations of the $\beta$-diketone improved distribution coefficients are obtainable.

It was found that when the chelation-extraction process of this invention was carried out with aqueous solutions containing uranyl nitrate less than 5% of the uranium was extracted. For example, when a solution of uranyl chloride in 0.5 N hydrochloric acid was contacted with 0.1 M thenoyltrifluoroacetone in benzene, the extraction coefficient for uranium between benzene and aqueous solution was about 0.01. The foregoing examples, therefore, illustrate a good separation of plutonium from its mixture with uranium and fission products.

In another embodiment of this invention plutonium is separated from its aqueous solution by contacting the aqueous solution with a chelating agent of the type specified above in the absence of an organic solvent. If sufficient fluorinated $\beta$-diketone is used, it acts as a solvent for the plutonium chelate compound, since the temperature of operation is above its melting point. When smaller amounts of fluorinated $\beta$-diketone are used the substantially water-insoluble plutonium chelate compound will precipitate from the aqueous solution and it may be separated by any suitable means, such as filtration or centrifugation.

EXAMPLE XX

A portion of an aqueous solution of trivalent plutonium, portions of which were used in Example XVIII, as contacted in several experiments with pure trifluoroacetylacetone in a volume ratio of 1. With a 5-minute contacting the amount of plutonium extracted varied between 5.6 and 8.5%. In experiments with a 10-minute shaking the values varied between 7.9 and 16.5%, indicating further oxidation of trivalent to tetravalent plutonium, which was then chelated and removed as the plutonium chelate compound.

EXAMPLE XXI

A portion of the aqueous solution used in Example XVII was contacted by a 10-minute shaking with an equal volume of pure trifluoroacetylacetone. The $\beta$-diketone extracted 106% plutonium, based on tetravalent plutonium content, indicating some hexavalent plutonium was chelated and extracted or was reduced and extracted.

Another embodiment of the present invention is the separation of neptunium and plutonium by preparing an aqueous solution of the mixture of plutonium and neptunium, oxidizing neptunium to a valence state greater than +4, maintaining plutonium in the tetravalent state, and contacting the aqueous solution with a chelating agent or with an organic solvent solution of the chelating agent of the type specified. The acid concentration, volume ratio and other conditions are the same as in the foregoing embodiments.

EXAMPLE XXII

An aqueous solution containing uranyl chloride, plutonium trichloride, neptunium tetrachloride, and 0.5 N hydrochloric acid was made 0.02 M in potassium iodate and allowed to stand at room temperature for twenty minutes. This oxidized plutonium to tetravalent plutonium and neptunium to a valence state greater than +4. The resultant solution was contacted with an equal volume of 0.15 M thenoyltrifluoroacetone in benzene for twenty-five minutes. More than 95% plutonium was chelated and extrated, and about 1% uranium and no neptunium were extracted. By washing the benzene phase with an equal volume of 0.5 N nitric acid, about 99% of the uranium and essentially none of the plutonium was re-extracted.

Another embodiment of this invention consists of separating plutonium and zirconium. In one aspect thereof an aqueous solution containing tetravalent zirconium and plutonium nitrates is contacted with an organic solvent solution of a fluorinated β-diketone of the type described above. An extraction of zirconium and plutonium as chelate compounds is obtained and the resultant organic solvent solution is contacted with a weakly acidic aqueous solution containing a reducing agent to convert plutonium to the trivalent state. Zirconium remains in the organic solvent as the chelate compound and plutonium is extracted by the aqueous solution as a trivalent plutonium salt. For this extraction of trivalent plutonium the aqueous solution has an acidity between 0.05 and 1 N. If higher acidities are used, part of the zirconium is extracted reducing the efficiency of separation of plutonium and zirconium. The first extraction step is illustrated below by Example XXIII.

EXAMPLE XXIII

Two milliliters of an aqueous solution containing 0.5 M uranyl nitrate, 0.5 N nitric acid, about 0.2 mg. of tetravalent plutonium nitrate per liter, and various fission products as nitrates was contacted with 1 ml. of 1.07 M trifluoroacetylacetone in benzene. After a 30-minute shaking the phases were separated and analyzed for plutonium, zirconium, and other fission products. Table XIII presents the extraction coefficients in benzene and the aqueous solutions of the various elements.

*Table XIII.—Relative chelation-extraction of tetravalent plutonium and various fission products*

| Element: | Extraction coefficient |
|---|---|
| Zirconium | >75. |
| Plutonium | 26. |
| Columbium | 0.054 |
| Strontium | 0.0077 |
| Yttrium | 0.0071 |
| Cerium (trivalent) | 0.0006 |

Since zirconium contributes between 30 and 40% of the soft γ-radiation present in a uranyl nitrate solution obtained from neutron-irradiated uranium after a 2- to 3-month aging, the removal of zirconium from plutonium is a major problem in decontamination.

In another aspect of this embodiment the aqueous solution of tetravalent plutonium and zirconium is treated with a reducing agent to convert plutonium to the trivalent state. The resultant solution is adjusted to an acidity of about 0.05 to 1 N strong inorganic acid. To maintain plutonium in the trivalent state a holding reductant, like hydrazine in an amount less than 1 M, e. g., 0.001 M, is preferably present. This solution is contacted with an organic solvent solution of chelating agent of the type disclosed above to extract a zirconium chelate compound. Plutonium remains in the aqueous solution and the desired separation of zirconium and plutonium is effected.

Example VII above covers an application of this aspect of the present embodiment since the γ decontamination is partially due to separation of zirconium from plutonium, when the latter is in the trivalent state, by washes with 0.4 M trifluoroacetylacetone in benzene. Of course, the process is applicable also where the molal ratio of zirconium to plutonium is greater than 1.

The over-all γ decontamination factor obtained in Example VIII in the step where the acid extract phase, after reduction of plutonium to trivalent plutonium and washes with benzene solution containing 0.825 M trifluoroacetylacetone, was 465, whereas in the preceding step the over-all factor was 5. These data indicate that zirconium was substantially removed by the latter step while the plutonium remained in the aqueous solution. The decontamination factor for this step, consisting of three washes with 0.825 M trifluoroacetylacetone in benzene, was 93.

Another embodiment consists of separating plutonium from an organic solvent solution of a plutonium chelate compound of the fluorinated β-diketones described above. The process of this embodiment is described in conjunction with the complete extraction and re-extraction process of the first embodiment.

The examples, presented above, of this invention were batch experiments, but the chelation-extraction step and re-extraction step may be effected by the use of batch, continuous batch, batch countercurrent, or continuous countercurrent methods.

From the foregoing it is seen that the process of this invention is suitable for separating plutonium from radioactive fission products which are desired for their use in medical work as radioactive materials and as tracers in biochemical studies in general. When the radioactive fission products are used as tracers in medical work, plutonium as an α-emitter should not be present as it is extremely harmful when received internally in the human body even in small concentrations.

The foregoing illustrations and embodiments of this invention are not intended to limit its scope, which is to be limited entirely by the appended claims.

What is claimed is:

1. A process for the separation of plutonium from an aqueous solution containing a salt of tetravalent plutonium and containing from about 0.05 to 1 N of a strong inorganic acid, which comprises contacting said aqueous solution with a fluorinated β-diketone having the general formula:

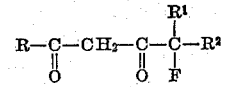

wherein R is a member of the group consisting of methyl, ethyl, isobutyl, hexyl, phenyl, thienyl, fluorophenyl, biphenyl, naphthyl, furyl, benzyl, phenylethyl methylphenyl and ethylphenyl radicals and R¹ and R² are members of the group consisting of hydrogen and fluorine.

2. A process for the separation of plutonium from an aqueous solution containing a salt of tetravalent plutonium and containing from about 0.05 to 1 N of a strong inorganic acid, which comprises contacting said aqueous solution with a solution in a nonpolar, substantially water-immiscible organic solvent of a fluorinated β-diketone having the general formula:

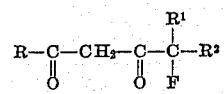

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl radicals and R¹ and R² are members of the group consisting of hydrogen and fluorine and separating the resultant aqueous phase and organic solvent extract phase containing a plutonium chelate compound of the fluorinated β-diketone.

3. The process of claim 2 in which the fluorinated β-diketone is trifluoroacetylacetone.

4. The process of claim 3 in which the organic solvent is benzene.

5. The process of claim 2 in which the fluorinated β-diketone is benzoyltrifluoroacetone.

6. The process of claim 5 in which the organic solvent is benzene.

7. The process of claim 2 in which the fluorinated β-diketone is thenoyltrifluoroacetone.

8. The process of claim 7 in which the organic solvent is benzene.

9. The process of claim 2 in which the fluorinated β-diketone is thenoyltrifluoroacetone and in which the organic solvent is toluene.

10. The process of claim 2 in which the inorganic acid is nitric acid and the concentration is between about 0.1 and 0.7 N.

11. The process of claim 2 in which the inorganic acid is hydrochloric acid and the concentration is between about 0.1 and 0.7 N.

12. A process for the separation of plutonium from an aqueous solution containing a salt of tetravalent plutonium and containing from about 0.05 to 1 N of a strong inorganic acid, which comprises contacting said aqueous solution with a solution, in a nonpolar, substantially water-immiscible organic solvent, of a fluorinated β-diketone having the general formula:

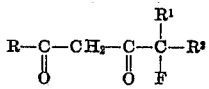

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl radicals and $R^1$ and $R^2$ are members of the group consisting of hydrogen and fluorine, separating the resultant aqueous phase and organic solvent extract phase containing a plutonium chelate compound of the fluorinated β-diketone, contacting said extract phase with an aqueous solution containing a material selected from the group consisting of hydrochloric acid, nitric acid, sulfuric acid, fluosilicate anions, hydroxylamine hydrochloride, ferrous chloride, hydroxylamine hydrochloride-ferrous chloride mixture, and a stannous chloride-nitric acid mixture, and separating the resultant organic solvent phase and aqueous extract phase containing a plutonium compound.

13. A process for the separation of plutonium from its mixture with uranium and fission products, which comprises dissolving said mixture in an aqueous solution of a strong inorganic acid, maintaining said plutonium in the tetravalent state and said uranium in the hexavalent state, adjusting the concentration of strong inorganic acid to between about 0.05 and 1 N, contacting said aqueous solution with a nonpolar, substantially water-immiscible organic solvent solution of a fluorinated β-diketone having the general formula:

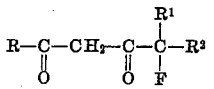

wherein R is a member of the group consisting of methyl, ethyl, isobutyl, hexyl, phenyl, thienyl, fluorophenyl, biphenyl, naphthyl, furyl, benzyl, phenylethyl methylphenyl and ethylphenyl radicals and $R^1$ and $R^2$ are members of the group consisting of hydrogen and fluorine, and separating the resultant aqueous phase and organic solvent extract phase containing a plutonium chelate compound of the fluorinated β-diketone.

14. A process for the separation of plutonium from its mixture with uranium and fission products, which comprises dissolving said mixture in an aqueous solution of a strong inorganic acid, maintaining said plutonium in the tetravalent state and said uranium in the hexavalent state, adjusting the concentration of strong inorganic acid to between 0.05 to 1 N, contacting said aqueous solution with nonpolar, substantially water-immiscible organic solvent solution of a fluorinated β-diketone having the general formula:

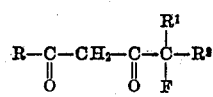

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl radicals and $R^1$ and $R^2$ are members of the group consisting of hydrogen and fluorine, separating the resultant aqueous phase and organic solvent extract phase containing a plutonium chelate compound of the fluorinated β-diketone, contacting said extract phase with a reducing agent selected from the group consisting of hydroxylamine hydrochloride, ferrous chloride, hydroxylamine hydrochloride plus ferrous chloride, and stannous chloride plus nitric acid in an acidic aqueous medium, and separating the resultant organic solvent phase and aqueous extract phase containing trivalent plutonium.

15. A process for the separation of plutonium from its mixture with uranium and fission products, which comprises dissolving said mixture in an aqueous solution of a strong inorganic acid, maintaining said plutonium in the tetravalent state and said uranium in the hexavalent state, adjusting the concentration of strong inorganic acid to between about 0.05 and 1 N, contacting said aqueous solution with a nonpolar, substantially water-immiscible organic solvent solution of a fluorinated β-diketone having the general formula:

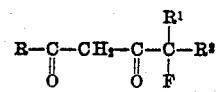

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl radicals and $R^1$ and $R^2$ are members of the group consisting of hydrogen and fluorine, separating the resultant aqueous phase and organic solvent extract phase containing a plutonium chelate compound of the fluorinated β-diketone, contacting said extract phase with an aqueous solution containing at least 0.1 N concentration of a strong inorganic acid and having a substantially greater acidity than the aqueous solution extracted, and separating the resultant organic solvent phase and aqueous extract phase containing tetravalent plutonium.

16. A process for the separation of plutonium from its mixture with uranium and fission products, which comprises dissolving said mixture in an aqueous solution of a strong inorganic acid, maintaining said plutonium in the tetravalent state and said uranium in the hexavalent state, adjusting the concentration of strong inorganic acid to between about 0.05 and 1 N, contacting said aqueous solution with a nonpolar, substantially water-immiscible organic solvent solution of a fluorinated β-diketone having the general formula:

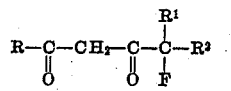

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl radicals and $R^1$ and $R^2$ are members of the group consisting of hydrogen and fluorine, separating the resultant aqueous phase and organic solvent extract phase containing a plutonium chelate compound of the fluorinated β-diketone, contacting said extract phase with an aqueous solution containing a small amount of fluosilicate ion, and separating the resultant organic solvent phase and aqueous phase containing a plutonium compound.

17. A process for the separation of plutonium from its mixture with uranium and fission products, which comprises dissolving said mixture in strong nitric acid, diluting to a nitric acid content of about 0.1 to 0.5 N, adding a small amount of ferrous salt and a small amount of hydroxylamine to convert any hexavalent plutonium to trivalent and tetravalent plutonium, adding sodium nitrite to convert trivalent plutonium to tetravalent plutonium, contacting the resultant solution with a nonpolar, substantially water-immiscible organic solvent solution of a fluorinated β-diketone having the general formula:

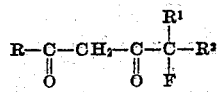

wherein R is a member of the group consisting of methyl, ethyl, isobutyl, hexyl, phenyl, thienyl, fluorophenyl, biphenyl, naphthyl, furyl, benzyl, phenylethyl methylphenyl and ethylphenyl radicals and $R^1$ and $R^2$ are members of the group consisting of hydrogen and fluorine and separating the resultant aqueous phase and organic solvent extract phase containing a plutonium chelate compound of the fluorinated β-diketone.

18. The process of claim 17 in which the fluorinated β-diketone is trifluoroacetylacetone and in which the organic solvent is benzene.

19. The process of claim 17 in which the fluorinated β-diketone is benzoyltrifluoroacetone and in which the organic solvent is benzene.

20. The process of claim 17 in which the fluorinated β-diketone is thenoyltrifluoroacetone and in which the organic solvent is benzene.

21. The process of claim 17 in which the organic solvent is toluene.

22. The process of claim 17 in which the organic solvent is hexafluoroxylene.

23. A process for the separation of plutonium from its mixture with neptunium, which comprises dissolving said mixture of plutonium and neptunium as salts in an aqueous solution of a strong inorganic acid, maintaining said plutonium in the tetravalent state and neptunium in a valence state greater than +4, adjusting the concentration of strong inorganic acid to between about 0.05 and 1 N, contacting said aqueous solution with a nonpolar, substantially water-immiscible organic solvent solution of a fluorinated β-diketone having the general formula:

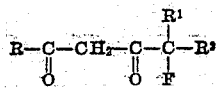

wherein R is a member of the group consisting of methyl, ethyl, isobutyl, hexyl, phenyl, thienyl, fluorophenyl, biphenyl, naphthyl, furyl, benzyl, phenylethyl methylphenyl and ethylphenyl radicals and $R^1$ and $R^2$ are members of the group consisting of hydrogen and fluorine, and separating the resultant aqueous phase and organic solvent extract phase containing a plutonium chelate compound of the fluorinated β-diketone.

24. A process for the separation of plutonium from its mixture with zirconium, which comprises contacting an aqueous solution containing salts of tetravalent plutonium and tetravalent zirconium, and from about 0.05 to 1 N of a strong inorganic acid with a nonpolar, substantially water-immiscible organic solvent solution of a fluorinated β-diketone having the general formula:

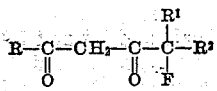

wherein R is a member of the group consisting of methyl, ethyl, isobutyl, hexyl, phenyl, thienyl, fluorophenyl, biphenyl, naphthyl, furyl, benzyl, phenylethyl methylphenyl and ethylphenyl radicals and $R^1$ and $R^2$ are members of the group consisting of hydrogen and fluorine, separating the resultant aqueous phase and organic solvent extract phase containing plutonium and zirconium chelate compounds of the fluorinated β-diketone, contacting said organic extract phase with a reducing agent as a weakly acidic aqueous solution and separating the resultant organic solvent phase containing said zirconium chelate compound and aqueous extract phase containing trivalent plutonium.

25. The process of claim 24 in which the fluorinated β-diketone is thenoyltrifluoroacetone and in which the organic solvent is benzene.

26. The process of claim 25 in which the reducing agent is a mixture of a ferrous salt and hydroxylamine hydrochloride.

27. A process for the separation of plutonium from its mixture with zirconium, which comprises dissolving said mixture in an aqueous solution of a strong inorganic acid, adding a reducing agent to convert tetravalent plutonium to trivalent plutonium, adjusting the concentration of the strong inorganic acid between about 0.05 and 1 N, contacting the resultant aqueous solution of salts of trivalent plutonium and tetravalent zirconium with a nonpolar, substantially water-immiscible organic solvent solution of a fluorinated β-diketone having the general formula:

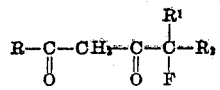

wherein R is a member of the group consisting of methyl, ethyl, isobutyl, hexyl, phenyl, thienyl, fluorophenyl, biphenyl, naphthyl, furyl, benzyl, phenylethyl methylphenyl and ethylphenyl radicals and $R^1$ and $R^2$ are members of the group consisting of hydrogen and fluorine, and separating the resultant aqueous phase containing said salt of trivalent plutonium and organic solvent extract phase containing a zirconium chelate compound of the fluorinated β-diketone.

28. The process of claim 27 in which the fluorinated β-diketone is trifluoroacetylacetone and in which the organic solvent is benzene.

29. The process of claim 27 in which the fluorinated β-diketone is benzoyltrifluoroacetone and in which the the organic solvent is benzene.

30. The process of claim 27 in which the fluorinated β-diketone is thenoyltrifluoroacetone and in which the organic solvent is benzene.

31. A process for the separation of plutonium from an organic solvent solution of a tetravalent plutonium chelate compound of a fluorinated β-diketone having the general formula:

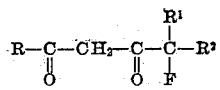

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl radicals and $R^1$ and $R^2$ are members of the group consisting of hydrogen and fluorine, which comprises contacting said solution with an aqueuos solution containing a material, selected from the group consisting of hydrochloric acid, nitric acid, sulfuric acid, fluosilicate anions, hydroxylamine hydrochloride, ferrous chloride, hydroxylamine hydrochloride-ferrous chloride mixture, and a stannous chloride-nitric acid mixture, and separating the resultant organic solvent phase and aqueous phase containing a plutonium compound.

32. A process for the separation of plutonium from an organic solvent solution of a tetravalent plutonium chelate compound of a fluorinated β-diketone having the general formula:

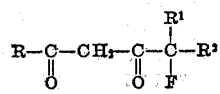

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl radicals and $R^1$ and $R^2$ are members of the group consisting of hydrogen and fluorine, which comprises contacting said solution with a reducing agent selected from the group consisting of hydroxylamine hydrochloride, ferrous chloride, hydroxylamine hydrochloride plus ferrous chloride, and stannous chloride plus nitric acid in an acidic aqueous medium, and separating the resultant organic solvent phase and aqueous phase containing a plutonium compound.

33. The process of claim 32 in which the reducing agent comprises hydroxylamine hydrochloride.

34. The process of claim 32 in which the reducing agent is stannous chloride.

35. The process of claim 32 in which the reducing agent comprises ferrous chloride.

36. A process for the separation of plutonium from an organic solvent solution of a tetravalent plutonium chelate compound of a fluorinated β-diketone having the general formula:

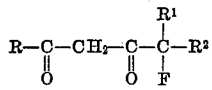

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl radicals and $R^1$ and $R^2$ are members of the group consisting of hydrogen and fluorine, which comprises contacting said solution with an aqueous solution containing at least 0.1 N concentration of a strong inorganic acid, and separating the resultant organic solvent phase and aqueous phase containing tetravalent plutonium.

37. The process of claim 36 in which the strong inorganic acid is nitric acid and the acid concentration is at least 1 N.

38. A process for the separation of plutonium from an organic solvent solution of tetravalent plutonium chelate compound of fluorinated β-diketone having the general formula:

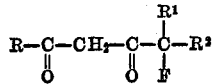

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl radicals and $R^1$ and $R^2$ are members of the group consisting of hydrogen and fluorine, which comprises contacting said solution with an aqueous solution containing a small amount of fluosilicate ion, and separating the resultant organic solvent phase and aqueous phase containing a plutonium compound.

39. A process for the separation of plutonium from an organic solvent solution of a tetravalent plutonium chelate compound of a fluorinated β-diketone having the general formula:

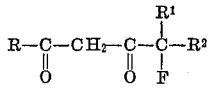

wherein R is a member of the group consisting of methyl, ethyl, isobutyl, hexyl, phenyl, thienyl, fluorophenyl, biphenyl, naphthyl, furyl, benzyl, phenylethyl, methylphenyl and ethylphenyl radicals and $R^1$ and $R^2$ are members of the group consisting of hydrogen and fluorine, which comprisees contacting said solution with a mixture of hydroxylamine hydrochloride and ferrous chloride in an acidic aqueous medium, and separating the resultant organic solvent phase and aqueous phase containing a plutonium compound.

References Cited in the file of this patent

UNITED STATES PATENTS

| | | |
|---|---|---|
| 2,161,184 | McKone et al. | June 6, 1939 |
| 2,197,498 | Guthmann | Apr. 16, 1940 |

FOREIGN PATENTS

| | | |
|---|---|---|
| 289,493 | Great Britain | Apr. 30, 1928 |

OTHER REFERENCES

Harvey et al.: Journal of the Chemical Society, August 1947, pages 1010-1021.